(12) United States Patent
Yu et al.

(10) Patent No.: US 9,767,929 B2
(45) Date of Patent: Sep. 19, 2017

(54) ADVANCED GRID SPACER DESIGN FOR A NUCLEAR FUEL ASSEMBLY

(71) Applicants: China Nuclear Power Technology Research Institute, Shenzhen, Guangdong (CN); China Guangdong Nuclear Power Holding, Shenzhen, Guangdong (CN)

(72) Inventors: Wenchi Yu, Guangdong (CN); Yuemin Zhou, Guangdong (CN); Weicai Li, Guangdong (CN); Xiaoming Chen, Guangdong (CN); Zhengzheng Pang, Guangdong (CN); Jingwen Yan, Guangdong (CN); Yan Guo, Guangdong (CN)

(73) Assignees: CHINA NUCLEAR POWER TECHNOLOGY RESEARCH INSTITUTE, Shenzhen (CN); CHINA GUANGDONG NUCLEAR POWER HOLDING, Shenzhen (CN)

( * ) Notice: Subject to any disclaimer, the term of this patent is extended or adjusted under 35 U.S.C. 154(b) by 358 days.

(21) Appl. No.: 13/783,426

(22) Filed: Mar. 4, 2013

(65) Prior Publication Data
US 2013/0230133 A1 Sep. 5, 2013

(30) Foreign Application Priority Data
Mar. 2, 2012 (CN) .......................... 2012 1 0053570

(51) Int. Cl.
*G21C 3/336* (2006.01)
*G21C 3/352* (2006.01)
*G21C 3/34* (2006.01)

(52) U.S. Cl.
CPC ............. *G21C 3/336* (2013.01); *G21C 3/352* (2013.01); *G21C 2003/3432* (2013.01); *Y02E 30/40* (2013.01)

(58) Field of Classification Search
CPC ......... G21C 3/352; G21C 3/322; Y02E 30/40; Y02E 30/38; G21Y 2004/30
USPC .......................... 376/438, 439, 442, 462, 441
See application file for complete search history.

(56) References Cited

U.S. PATENT DOCUMENTS

| 4,726,926 A * | 2/1988 | Patterson | G21C 3/322 376/261 |
| 5,180,548 A * | 1/1993 | Verdier | G21C 3/322 376/438 |
| 5,263,072 A * | 11/1993 | Canat | G21C 3/322 376/438 |

(Continued)

*Primary Examiner* — Jack W Keith
*Assistant Examiner* — Lily C Garner

(57) ABSTRACT

A new, improved grid spacer for a nuclear fuel assembly is provided, comprising several straps which intersect each other alternatively to form a plurality of grid cells and fuel rods reside in some of the grid cells; the grid spacer further comprises mixing elements set at the corner of the grid cells in which the fuel rods have resided; wherein the mixing element comprises a mixing vane stretching towards the direction of the fuel rod and a flow funnel set on the bended edge of the mixing vane continuously and extending towards adjacent grid cells; the mixing vane and the flow funnel set across two sides of two adjacent grid cells respectively, and the flow funnel introduces the coolant in the grid cell at its side to the mixing vane, then the mixing vane introduces the coolant to the grid cell at its own side.

9 Claims, 4 Drawing Sheets

(56) References Cited

U.S. PATENT DOCUMENTS 6,542,567 B1 * 4/2003 Mayet .................. G21C 3/3563
376/438
6,650,723 B1 * 11/2003 Kang ..................... G21C 3/352
376/438

* cited by examiner

ADVANCED GRID SPACER DESIGN FOR A NUCLEAR FUEL ASSEMBLY

FIELD OF THE INVENTION

The present invention is an advanced grid spacer design for a nuclear fuel assembly to provide enhanced flow mixing performance.

BACKGROUND OF THE INVENTION

The fuel assembly in the nuclear power plant generally includes five major components comprising upper nozzle, guiding tubes, grid spacers, fuel rods and lower nozzle. Wherein, a grid space is always assembled from a number of grid straps. For a 17×17 lattice grid spacer design, it has 17*17=264 grid cells. There are twenty-four guide thimble tubes and one instrument tube placed in parallel in 25 selected grid cells of the grid spacer. Thus, the grid spacer successfully separates the guide thimble tubes to provide control and spacing between the guide thimble and instrument tubes, as a result, a tube bundle can be constituted. The upper and lower ends of the tube bundle are attached with the upper nozzle and the lower nozzle, respectively, to form a skeleton structure of the fuel assembly. The fuel rods are placed in parallel in all remaining grid cells. The coolant flows through the fuel bundle from the bottom of the lower nozzle and out from the upper nozzle, moderating the neutrons and carrying away the released energy due to nuclear fission, and thus playing an important role in cooling for the fuel rods.

In order to increase the heat transfer between the coolant and the fuel rods, mixing vanes are placed at the corner of grid cell in which a fuel rod resides, to increase the cooling effects made by the coolant flow to the fuel rods. FIG. 1 is a schematic diagram of a unit grid strap cell 1 in prior art. Wherein, a mixing element is at the corner of the grid cell through a slot and some slot holes are set to increase the flow path for the coolant. Besides, adjusting the mixing vane area and angle etc. of the mixing vane are intended to improve the heat transfer efficiency. However, the structure of the existing mixing vanes has at least the following deficiencies: 1, it is difficult to direct the coolant from adjacent grid cells to provide flow mixing, so that heat transfer may not be adequate; 2, in a grid cell with having single coolant flow coolant passage, there exists ineffective vortices. The heat exchange is inadequate and insufficient; 3, during flowing coolant mixing, pressure drops are high.

SUMMARY OF THE INVENTION

The present invention is to provide an advanced grid design for a nuclear fuel assembly which can direct the coolant from adjacent grid cells to provide added coolant mixing together resulting in a better performance in heat transfer, and also provide a mixing element for the grid spacer.

The solution for solving this technical issue is detailed in the present invention by adopting the following methods: a new improved grid spacer design for a nuclear fuel assembly, comprising several straps which intersect each other alternatively to form a plurality of grid cells and fuel rods reside in some of the grid cells; the grid spacer further comprises by-pass flow channels as mixing element at the corner of grid cells in which the fuel rods have resided; the mixing element comprises a mixing vane bending towards the direction of the fuel rod and a flow funnel set on the bended edge of the mixing vane continuously and extending towards adjacent grid cells; the mixing vane and the flow funnel set across two sides of two adjacent grid cells respectively, and the flow funnel directs the coolant in the grid cell at its side to the mixing vane, then the mixing vane introduces the coolant to the grid cell at its own side.

Advantageously, the flow funnel is a streamlined shape, and the cross-section area of the channel in the flow funnel is gradually reduced towards the direction of the mixing vane.

Advantageously, the cross-section of the inlet in the flow funnel is either a semi-circle, or an oval, or a rectangular with chamfered edges, or a triangular with chamfered edges or a square with chamfers.

Advantageously, the edge of the inlet in the flow funnel can either be an inverted obtuse, or a chamfer or a radiused edge.

Advantageously, a mounting slot is provided on the strap, two side-walls of the flow funnel and two side-walls of the mounting slot contact to each other in a fixed connection, and the bottom edge of the flow funnel and the bottom edge of the mounting slot constitute the inlet of the flow funnel portion together; or, two side-walls of the flow funnel contact with the surface of the strap directly, the channel in the flow funnel is surrounded by the flow funnel and the surface of the strap, and the outlet opening of the channel faces the mixing vane.

Advantageously, a curved cutout conformed with the shape of the outer diameter of fuel rod is provided on the mixing vane, and the mixing vane can also be twisted to a certain angle along the direction of its length.

Advantageously, a protrusion for communicating two adjacent grid cells is provided on the surface of the strap, and/or, a slotted cutout is provided on the intersect position of two straps.

A mixing element for the grid spacer for the nuclear fuel assembly is provided as well, the mixing element comprises a mixing vane stretching towards the direction of the fuel rod and a flow funnel set on the bended edge of the mixing vane continuously and extending towards adjacent grid cells; the mixing vane and the flow funnel set across two sides of two adjacent grid cells respectively, and the flow funnel directs the coolant in the grid cell at its side to the mixing vane, then the mixing vane introduces the coolant to the grid cell of its own side.

Advantageously, the flow funnel is streamlined, and the cross-section area of the channel in the flow funnel is gradually reduced towards the direction of the mixing vane; the cross-section of the inlet in the flow funnel can either be a semi-circle, or an oval, a rectangular with a chamfered edges, or a triangular with a chamfered edges, or a square with a chamfered edges.

Advantageously, a curved cutout conformed with the shape of the fuel rod is provided on the mixing vane, and the mixing vane can be twisted to a certain angle along the direction of its length.

When implementing the technical solution of the present invention, since the mixing vane and the flow funnel is set across two sides of two adjacent grid cells, the coolant in adjacent grid cells can be introduced to impinge the mixing vane, thus improving the transfer of the coolant between grid cells, enhancing the mixing effect, and improving the effect of heat transfer between the coolant and the fuel rods.

In addition, the use of streamlined flow funnel has reduced the undesirable vortices; moreover, the edge of the inlet in the flow funnel can have either a chamfered edges or a fillet radius edges so as to reduce the pressure drop effectively; and the deflecting amount of the coolant can be determined by changing the shape of the cross-section of the inlet in the flow funnel, thus the effectiveness of heat transfer can be controlled according to the design requirements

BRIEF DESCRIPTION OF THE DRAWINGS

The present invention is further described with reference to the accompanying drawings, sketches and embodiments in the following figures.

DETAILED DESCRIPTION OF THE PREFERRED EMBODIMENT

Referring to FIGS. 2-8, a grid spacer in the first embodiment of the present invention is provided, which can be used for a nuclear fuel assembly in a nuclear power plant. The grid spacer comprises several straps 11 which intersect each other alternatively to form a plurality of grid cells 12 arranged in a matrix. The guiding thimble tubes reside in some of the grid cells 12 and the fuel rods 14 reside in other grid cells 12, constituting a whole fuel assembly together with an upper nozzle and a lower nozzle.

Figure 1:
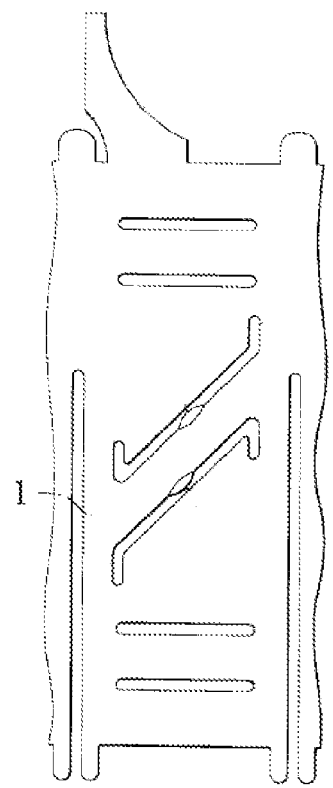
FIG. 1 is a schematic diagram of a mixing element of conventional design.
Figure 2:
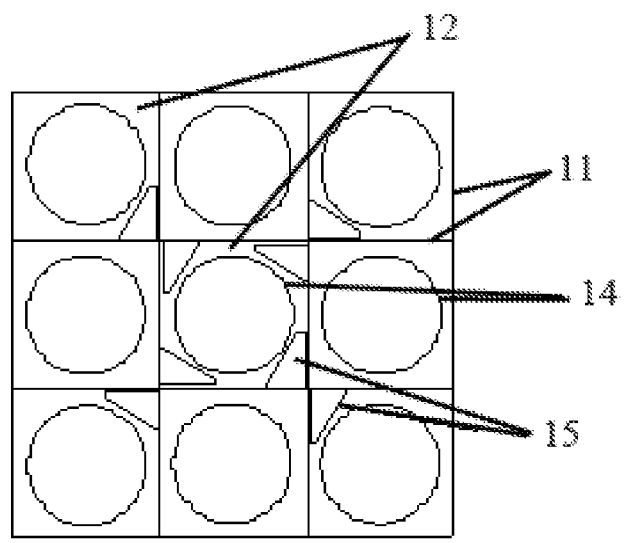
FIG. 2 is a schematic diagram of a partial grid spacer in the present invention.
Figure 3:
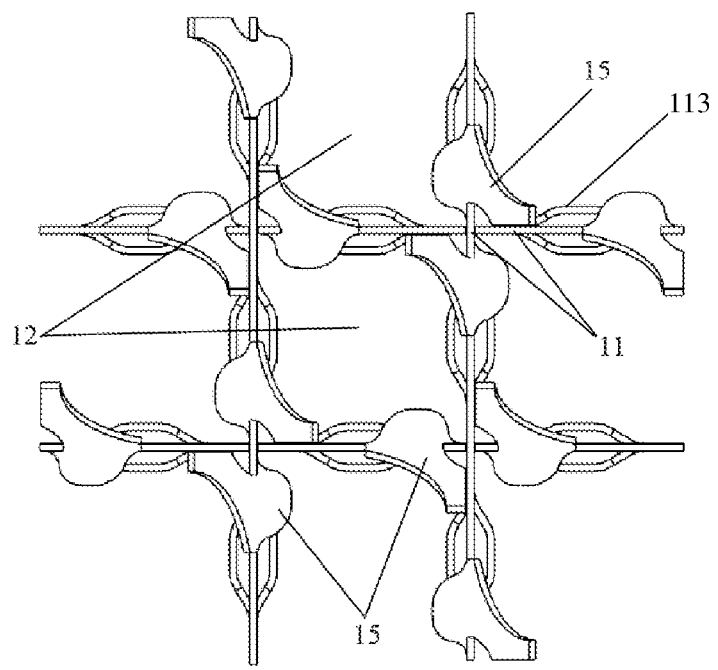
FIG. 3 is a schematic diagram of a top view of a partial grid spacer in the present invention.

Referring to FIG. 2, mixing elements 15 set at one or more corner of a grid cell 12 in which the fuel rods 14 have resided. In this way, the coolant can be mixed by the mixing elements 15 to make the deflecting amount greater than ¼, thus enhancing the mixing effect and realizing the effectiveness of heat transfer to the fuel rod 14.

Referring to FIGS. 4-7, the mixing element 15 comprises a mixing vane 151 stretching towards the direction of the fuel rod 14 and a flow funnel 152 extending towards adjacent grid cells 12. The flow funnel 152 sets on the bended edge of the mixing vane 151 continuously, and the flow funnel 152 and the mix vane 151 can be made from one piece or from separate pre-fabricated pieces be fabricated to form a whole by means of welding.

The flow funnel 152 protrudes outwards from the bended edge of the mixing vane 151 and in a form of streamlined shape. The cross-section area of the channel in the flow funnel 152 is gradually reduced towards the direction of the mixing vane 151 to introduce more coolant impinging the mixing vane 151 to enhance the effectiveness of flow mixing.

Furthermore, the cross-section of the inlet in the flow funnel 152 can be either a semi-circle, or an oval, or a rectangular with chamfered edges, or a triangular with chamfered edges, or a square with chamfered edges or other equivalent shapes, and different effects of coolant transfer can be obtained through adjusting the cross-section on demands in order to have desirable flow-oriented effects.

Furthermore, the edge of the inlet in the flow funnel 152 can be either an inverted obtuse, or a chamfer or a fillet radii, etc. to control the pressure drop for the coolant entering.

The mixing vane 151 is at above the flow funnel 152 and the mixing vane 151 and the flow funnel 152 are separately in two adjacent cells 12. Wherein, the mixing vane 151 extends towards the direction of the fuel rod 14 to direct the coolant to the surrounding of the fuel rod 14 to carry heat away so as to cool the fuel rod 14. The length and the area of the mixing vane 151 can be adjusted according to the demand for heat transfer effects.

Furthermore, the mixing vane 151 can be twisted to a certain angle along the direction of its length to enhance the mixing effect on the cooling flow.

Figure 7:
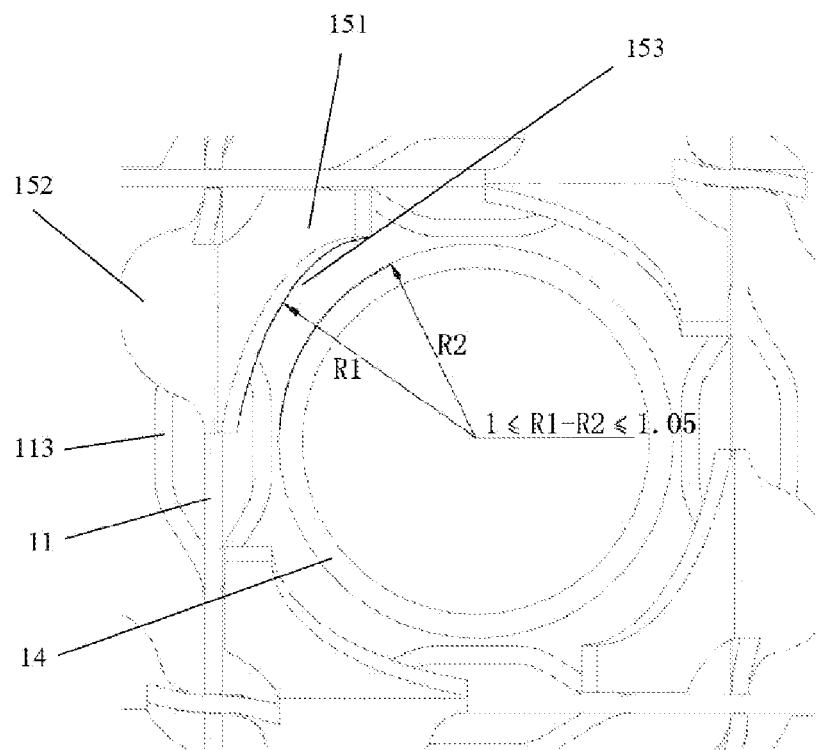
FIG. 7 is a schematic diagram of a top view of a partial grid spacer in the present invention.

Furthermore, referring to FIG. 7, a curved cutout 153 conformed with the shape of the outer diameter of fuel rod 14 is on the mixing vane 151, thus a constant circular gap can be formed between the curved cutout 153 and the outer diameter of fuel rod 14 after the mixing vane 151 is bent in order to facilitate the flowing of the coolant for heat transfer. As shown in the figure, the difference between the radius R1 of the curved cutout 153 and the radius R2 of the fuel rod 14 is approximately $1 \leq R1-R2 \leq 1.05$ mm.

Figure 4:
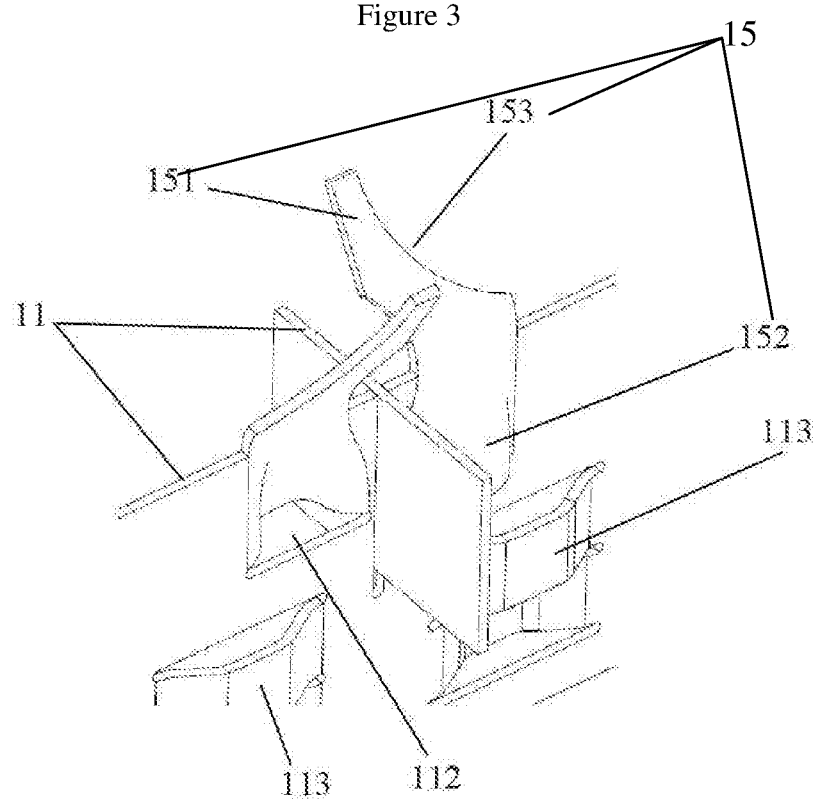
FIG. 4 is a schematic diagram of a three dimensional sketch of a partial grid spacer in the present invention.
Figure 5:
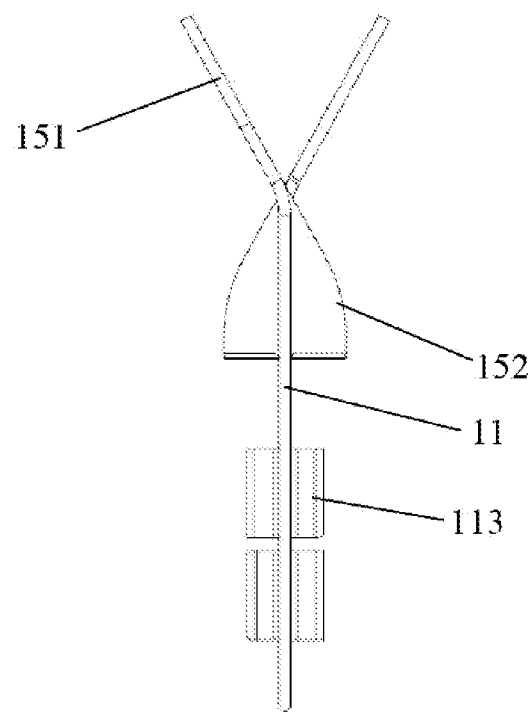
FIG. 5 is a schematic diagram of a side view of a partial grid spacer in the present invention.
Figure 6:
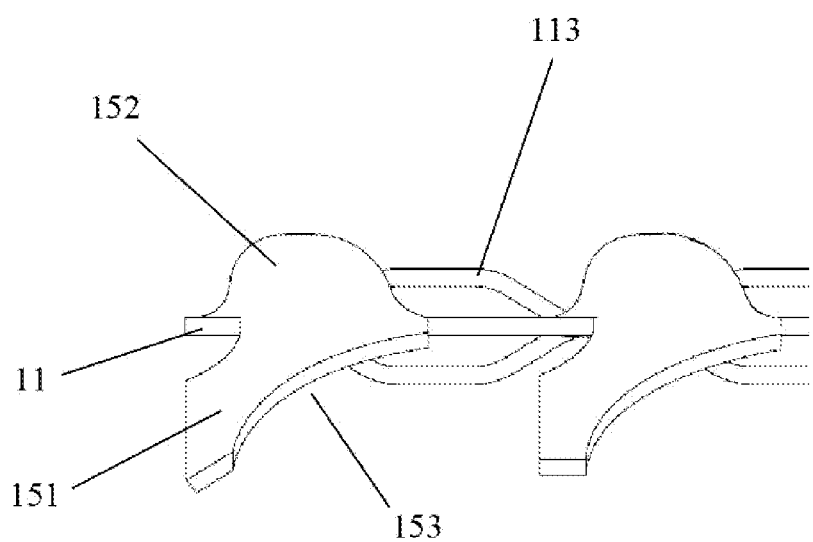
FIG. 6 is a schematic diagram of a three dimensional sketch of a partial grid spacer strap in the present invention.

Referring to FIG. 4, in this embodiment, a mounting slot 112 is provided on the strap 11 to facilitate the installation of the mixing element 15, two side-walls of the flow funnel 152 and two side-walls of the flow funnel 112 mounting slot 112 connect to each other in a integral piece connection, for example by means of welding. The bottom edge of the flow funnel 152 and the bottom edge of the mounting slot 112 constitute the inlet of the flow funnel 152 together to introduce the coolant in the adjacent grid cells 12 (FIG. 3) to the side in which the mixing vane 151 resides, and the mixing vane 151 can be used to mix them to enhance the heat transfer. In order to facilitate the installation of the mixing vane 151 by means of welding, a slotted area for welding can be provided on the position where the mixing vane 151 and the strap 11 are intersected to provide for welding.

Of course, the slotted area for welding on the mixing vane 151 can be eliminated as the connection of the mixing element 15 and the strap 11 is in the strap 11 in the embodiment, and the area of the mixing vane 151 can be increased as shown in FIG. 4.

It is understandable that there could have no mounting slot 112 on the strap 11, but the mixing element 15 is intersected to the surface of the body of the strap 11 directly. In this case, the channel in the flow funnel 152 is surrounded by the flow funnel 152 and the surface of the strap 11, and the exit of the channel faces the mixing vane 151, so as to direct the coolant in the grid cell 12 at the side where the flow funnel 152 resides in to the grid cell 12 at the side where the mixing vane 151 resides in, thus more coolant impinging the mixing vane 151 to improve the effect of heat transfer.

Figure 8:
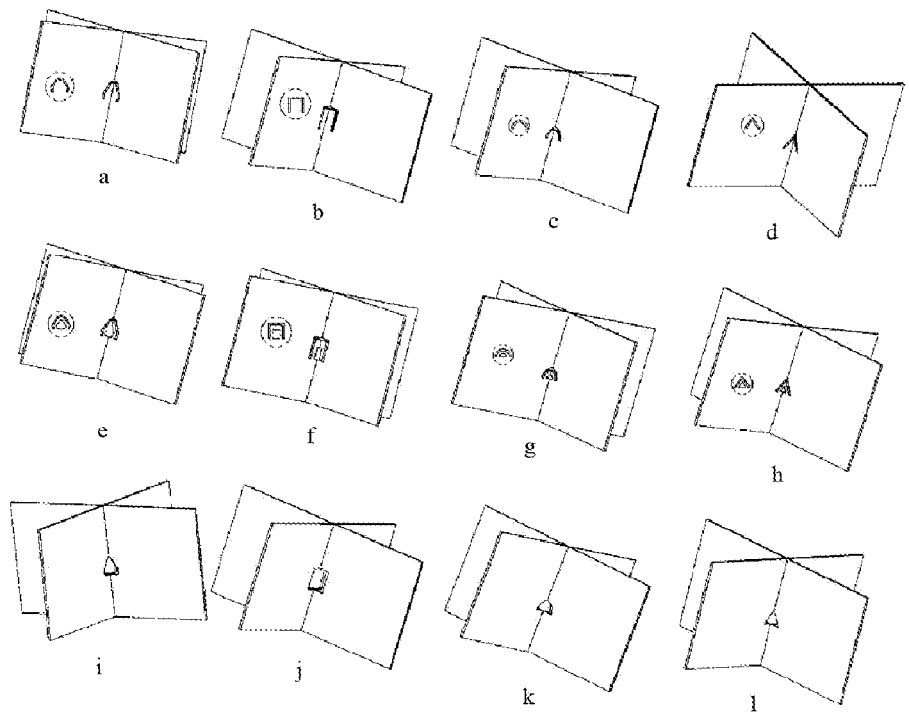
FIG. 8 is a group of schematic diagrams a-1 of grid spacer intersect through different forms and shapes of protrusions in the present invention.

Furthermore, referring to FIG. 8, protrusions 113 can be formed on the surface of the strap 11 by means of cutting or punching, and two adjacent grid cells 12 can be communicated through the protrusions 113. The protrusion can be of various shapes such as a circle, a semi-circle, a square, an oval, a triangular, etc. as shown in diagrams a-1. The flowing of the coolant between adjacent grid cells 12 can be enhanced through the set of the protrusion as well as the effects for mixing and heat transfer.

Furthermore, referring to FIG. 8, slotted cutouts can be provided on the intersect position of two straps 11 and the shape of the slotted cutouts can be designed based on design requirements. The number of the connecting points of two straps 11 can be increased through the set of the intersection. That is to say, the upper side and the lower side of two straps 11 can be welded as well as the intersect at the middle of two straps, thereby increasing the number of welds to improve the joint strength between two straps 11 as well as the rigidity and safety. Moreover, the number of communicating paths among grid cells separated by the strap 11 is increased through the set of the flow channels so as to balance the flowing pressure differences among the grid cells and result in a better flow balancing. As a result, the heat transfer is enhanced (the maximum temperature is reduced by 1-2° C. and the Nu (Nusselt number) is increased by 5%-8%) and the influence on the effective flow path is lengthened, thus the heat transfer is more effective.

The above description is only some preferred embodiments of the present invention instead of limitations of the present invention. Various modifications and changes can be made to the present invention. Any modifications and improvements made within the ideas and principles of the present invention should be within the scope of the claims in the present invention.

The invention claimed is:

1. A grid spacer design for a nuclear fuel assembly, comprising several straps which intersect each other alternatively to form a plurality of grid cells and fuel rods reside in some of the cells; the grid spacer further comprises mixing elements at the corner of the grid cells in which the fuel rods have resided; wherein the mixing element comprises a mixing vane stretching towards the direction of the fuel rod and a flow funnel set on the bended edge of the mixing vane continuously and extending towards adjacent grid cells; wherein the flow funnel and the mixing vane are formed from a single sheet; wherein one flow funnel is only connected to one mixing vane; the flow funnel protrudes outwards from the bended edge of the mixing vane; the mixing vane and the flow funnel set across two sides of two adjacent grid cells respectively, and the flow funnel directs the coolant in the grid cell to the mixing vane, then the mixing vane directs the coolant to the grid cell, wherein the mixing vane is on the opposite side of the grid cell as the flow funnel; the flow funnel is streamlined, and the cross-sectional area of the channel in the flow funnel is gradually reduced in the direction towards the mixing vane and the gradual decreasing begins at an inlet of the flow funnel.

2. The grid spacer design for a nuclear fuel assembly of claim 1, wherein the cross-section of an inlet in the flow funnel can be either a semi-circle, or an oval, or a rectangle with chamfered edges, or a triangle with chamfered edges, or a square with chamfered edges.

3. The grid spacer design for a nuclear fuel assembly of claim 2, wherein the edge of the inlet in the flow funnel can be either an inverted obtuse, or a chamfer, or a radiused edge.

4. The grid spacer design for a nuclear fuel assembly of claim 1, wherein a curved cutout conformed with the shape of the outer diameter of fuel rod is provided on the mixing vane, and the mixing vane can be twisted to a certain angle along the direction of its length.

5. The grid spacer design for a nuclear fuel assembly of claim 2, wherein a curved cutout conformed with the shape of the outer diameter of fuel rod is provided on the mixing vane, and the mixing vane can be twisted to a certain angle along the direction of its length.

6. The grid spacer design for a nuclear fuel assembly of claim 3, wherein a curved cutout conformed with the shape of the outer diameter of fuel rod is provided on the mixing vane, and the mixing vane can be twisted to a certain angle along the direction of its length.

7. The grid spacer design for a nuclear fuel assembly of claim 1, wherein a protrusion for communicating two adjacent grid cells is provided on the surface of the strap, and/or, a slotted cutout is provided on the intersect position of two straps.

8. A mixing element for a grid spacer for a nuclear fuel assembly, wherein the mixing element comprises a mixing vane stretching towards the direction of the fuel rod and a flow funnel set on the bended edge of the mixing vane continuously and extending towards adjacent grid cells; wherein the flow funnel and the mixing vane be formed from a single sheet; wherein one flow funnel is only connected to one mixing vane; the mixing vane and the flow funnel set across two sides of two adjacent grid cells respectively, and the flow funnel introduces the coolant in the grid cell, then the mixing vane directs the coolant to the grid cell, wherein the mixing vane is on the opposite side of the grid cell as the flow funnel; the cross-section area of the channel in the flow funnel is gradually reduced towards the direction of the mixing vane and the gradual decreasing begins at an inlet of the flow funnel; the cross-section of the inlet in the flow funnel is either a semi-circle, or an oval, or a rectangle with chamfered edges, or a triangle with chamfered edges, or a square with chamfered edges.

9. The mixing element of claim 8, a curved cutout conformed with the shape of the fuel rod is provided on the mixing vane, and the mixing vane can be twisted to a certain angle along the direction of its length.

* * * * *